United States Patent Office 2,996,438
Patented Aug. 15, 1961

2,996,438
RECOVERY OF INDENE BY AZEOTROPIC PURIFICATION WITH N-HEXANOL
Edward John Schwoegler, Munster, and Richard Ernst Putscher, Hammond, Ind., assignors, by mesne assignments, to Neville Chemical Company, Pittsburgh, Pa., a corporation of Pennsylvania
No Drawing. Filed July 27, 1956, Ser. No. 600,382
4 Claims. (Cl. 202—42)

This invention relates to a process for separating indene from hydrocarbon mixtures containing it by azeotropic distillation wherein the non-indene constituents are removed as an azeotrope with n-hexanol.

Indene-containing oils such as those obtained by fractional distillation of coal tar oils, water gas oils, drip oils, etc., contain hydrocarbons boiling closely to indene and consequently the recovery of all of the indenes from these oils is difficult. The oils are usually fractionally distilled to produce a naphtha fraction which may contain from 30–75% of indene but more typically contain 30–60%. These naphthas generally boil in the range of about 160° to 190° or 200° C. or slightly higher. The non-indene constituents comprise saturated hydrocarbons which are largely naphthenic in nature; substituted benzenes such as styrene, ethyl benzenes trimethyl benzenes, etc.; and some non-hydrocarbon constituents such as methyl pyridines, benzonitrile, coumarone, methyl coumarone, etc.

When indene fractions containing as much as 75% of indene are produced by fractional distillation, the indene recovery amounts to only about 20% of the indene available from the starting material. Consequently the production of such fractions by straight fractional distillation entails a high loss of available indene.

Indene is largely used at present for producing resins. Pure indene is not commercially available and a process which will produce high purity indene is desirable since the uses of indene could be extended. As an example, it would permit the production of valuable indene derivatives not now commercially feasible or possible.

It has heretofore been proposed to separate indenes by azeotropic distillation of indene-containing naphthas using a material which will form an azeotrope with both indene and the non-indene constituents. The azetropes of the non-indene constituents boil below the azeotrope of indene. The indene may be recovered from the bottoms fraction either by continuing the azeotropic distillation or by straight non-fractional distillation of the residue. In this way an indene product said to contain from 89% to as much as 98% indene may be produced. However, the data reported show recoveries of only about 41% to about 65% of the indene contained in the charge as a product containing 90% to 94% indene. Such a process is described in United States Patent 2,279,780, issued to Carl H. Engel.

We have discovered that when using an azeotrope former which forms an azeotrope only with the non-indene constituents and not with indene, products of comparable purity can be obtained, while the recovery amounts to 75–90% of the indene present in the naphtha charge. The azeotrope former employed is n-hexanol. It is known from the literature that n-hexanol does not form an azeotrope with indene (see Lecate, "Tables Azeotropiques," Brussels, l'Auteour, July 1947).

In one specific embodiment our process comprises subjecting an indene-containing naphtha to azeotropic distillation in the presence of n-hexanol, thereby removing the major portion of the non-indene component of the naphtha and thereafter subjecting the residue to fractional distillation in a high efficiency column to recover from about 70% to about 95% of the indene in the original naphtha at a purity of at least about 75%.

The starting materials are generally prepared as previously described by fractional distillation of indene-containing oils to produce a fraction containing a major portion of the indene in said oils. While the boiling range of the naphtha produced is not critical, it is generally in the range of about 160° to about 200° C. While the naphtha may contain 30% to 70% or 75% indene, for the purposes of this invention it is preferred to start with a naphtha containing about 30 to about 60% indene since such naphthas will represent a higher recovery of available indene from the starting oil. If the indene content is too low it represents an added load on the azeotropic distillation step since it requires removal of a larger amount of non-indene constituents.

The azeotropic distillation may be carried out on a continuous basis or may be carried out in a batch operation. In any event the n-hexanol is added to the distillation step together with the naphtha. In batch operations all of it may be added initially, or it may be added intermittently or continuously while the distillation proceeds. Additional of excess n-hexanol beyond that required to insure removal of the non-indene constituents serves no useful purpose. Any excess n-hexanol present in the bottoms product may be removed by non-azeotropic fractional distillation since its boiling point (157.8° C.) is well below that of indene (182.6° C.) or by known methods such as continuous solvent extraction with low boiling saturated hydrocarbons such as hexane.

The following example is given to illustrate the effectiveness of the process. The naphtha employed had the characteristics shown in Table I. It is evident from the refractive indices that the naphtha is highly aromatic.

TABLE I

*Distillation data on coal tar naphtha fraction*

[25-plate column; reflux ratio 10 to 1]

| Fraction | 750 mm. | | | 100 mm. | | |
|---|---|---|---|---|---|---|
| | Vapor Temp., ° C. | Wt., Percent | $n_D^{25}$ | Vapor Temp., ° C. | Wt., Percent | $n_D^{25}$ |
| 1 | 135–160 | 1.1 | 1.4944 | 97–101 | 4.3 | 1.5000 |
| 2 | 165 | 2.5 | 1.5025 | 104 | 6.2 | 1.5085 |
| 3 | 170 | 18.7 | 1.5158 | 107 | 13.8 | 1.5185 |
| 4 | 175 | 29.9 | 1.5327 | 109 | 13.9 | 1.5288 |
| 5 | 177 | 9.6 | 1.5475 | 111 | 10.6 | 1.5390 |
| 6 | 178 | 8.2 | 1.5526 | 112 | 4.8 | 1.5450 |
| 7 | 179 | 12.7 | 1.5562 | 113 | 11.1 | 1.5507 |
| 8 | 180 | 4.5 | 1.5561 | 114 | 15.6 | 1.5570 |
| 9 | 181 | 0.9 | 1.5508 | 115 | 12.0 | 1.5584 |
| 10 | 185 | 0.9 | 1.5422 | Residue | 6.1 | 1.5410 |
| 11 | 189 | 1.9 | 1.5300 | | | |
| Residue Heavy Oil | | 3.0 | | | | |
| Resin | | 4.3 | | | | |
| Total Recovery | | 98.2 | | | 98.4 | |

One hundred parts of coal tar naphtha fraction containing 37 parts of indene were mixed with 180 parts by volume of n-hexanol. This mixture was subjected to distillation in a 100-plate Podbelniak distilling column. The distillation was conducted until a sharp break in the overhead vapor temperature was noted. This occurred at 157° C. and the temperature rose rapidly to 165° C. An intermediate fraction was collected at 165–178° C. and the indene rich fraction was collected at 178–181° C. The first fraction or azeotropic mixture was treated to remove n-hexanol and was found to constitute nearly 40% of the initial coal tar naphtha charge. On analysis it was indene-free. The results are summarized in Table II.

TABLE II

*Azeotropic concentration of indene from coal tar naphtha fraction with n-hexanol*

[Indene content of CTNF 37%]

| Fraction | Boiling Point, °C. | Vol., Percent | $n_D^{25}$ | $D_4^{25}$ | RI [1] | Indene, Percent |
|---|---|---|---|---|---|---|
| 1 | Hydrocarbons from azeotrope. | 38.8 | 1.5040 | 0.885 | 1.0598 | 0.0 |
| 2 | 165–178 | 17.8 | 1.5255 | 0.938 | 1.0565 | 20–30 |
| 3 | 178–181 | 36.7 | 1.5538 | 0.9674 | 1.0701 | 75–80 |
|   | Bottoms | 6.7 | | | | |

[1] Refractivity intercept ($n_D - 0.5d$).

Thus 75% of the indene present in the coal tar naphtha fraction was recovered as a 75–80% indene containing composition. This could be increased somewhat by subjecting the small fraction above referred to to further azeotropic distillation, for example, by combining it with another batch of naphtha to be distilled.

The above run was made at atmospheric pressure. However, sub-atmospheric or super-atmospheric pressures may likewise be employed.

The above example is given by way of illustration and should not be construed as limiting the invention to the exact details described.

We claim as our invention:

1. A process for recovering high purity indene from highly aromatic naphthas containing substantial amounts of indene which comprises subjecting said mixtures to distillation in the presence of an amount of n-hexanol sufficient to form azeotropes with non-indene constituents, removing a major portion of the non-indene constituents as their n-hexanol azeotropes and recovering indene of enhanced purity.

2. The process of claim 1 wherein the still residue is subjected to efficient non-azeotropic fractional distillation to recover a fraction of high purity indene as an overhead product.

3. A process for recovering high purity indene which comprises subjecting a highly aromatic naphtha boiling principally within the range of about 160° C. to about 200° C. and containing at least about 30% indene to distillation in the presence of n-hexanol, removing a major portion of non-indene constituents as their n-hexanol azeotrope and recovering indene of enhanced purity.

4. The process of recovering high purity indene from highly aromatic naphthas containing at least about 30% indene and boiling principally within the range of about 160° C. to about 200° C. which comprises distilling said naphtha in the presence of n-hexanol, removing the major portion of non-indene constituents in the form of their n-hexanol azeotropes, subjecting the indene-containing bottoms from the azeotropic distillation to an efficient non-azeotropic fractional distillation and recovering from about 70% to about 95% of the indene in the original naphtha as an overhead product in a purity of at least about 75% by volume.

References Cited in the file of this patent

UNITED STATES PATENTS 2,279,780     Engel     Apr. 14, 1942

FOREIGN PATENTS 513,566     Great Britain     1939

OTHER REFERENCES

Mair: "Journal of Research of the National Bureau of Standards," vol. 27, No. 1, pages 44–50, July 1941.

Weissberger: "Distillation," 1951, pages 359–368.

Horsley: "Azeotropic Data," June 1952, page 188.